United States Patent [19]

Watanabe et al.

[11] 4,033,017
[45] July 5, 1977

[54] MANUFACTURING METHOD OF A HERMETICALLY SEALED TERMINAL

[75] Inventors: Akira Watanabe, Funabashi; Saburo Harada, Tokyo, both of Japan

[73] Assignees: Kabushiki Kaisha Seikosha; Koto Denki Kabushiki Kaisha, both of Japan

[22] Filed: Jan. 28, 1976

[21] Appl. No.: 653,003

[30] Foreign Application Priority Data

Jan. 28, 1975  Japan .............................. 50-11660
Jan. 28, 1975  Japan .............................. 50-11661

[52] U.S. Cl. .............................. 29/25.35; 29/628; 174/50.56; 310/9.4
[51] Int. Cl.² .......................................... B01J 17/00
[58] Field of Search ........... 29/25.35, 628; 310/9.4, 310/9.1; 174/50.56, 50.58

[56] References Cited

UNITED STATES PATENTS

| | | | |
|---|---|---|---|
| 3,351,700 | 11/1967 | Savolainen et al. | 174/50.56 |
| 3,735,166 | 5/1973 | Bradley | 310/9.4 |
| 3,775,816 | 12/1973 | Gordon et al. | 29/25.35 |
| 3,805,348 | 4/1974 | Nagata et al. | 29/25.35 |

*Primary Examiner*—Frank T. Yost
*Attorney, Agent, or Firm*—Robert E. Burns; Emmanuel J. Lobato; Bruce L. Adams

[57] ABSTRACT

The component parts of a hermetically sealed terminal is a terminal plate made by utilizing chemical etching technique, lead wires, a glass material and an outer frame. All component parts are assembled in moulds, and hermetically sealed by one heating process. After heating process is over, unnecessary parts of the terminal plate are broken off to divide a separate terminal.

1 Claim, 6 Drawing Figures

MANUFACTURING METHOD OF A HERMETICALLY SEALED TERMINAL

BACKGROUND OF THE INVENTION

This invention relates to a method of manufacturing a hermetically sealed terminal for a quartz crystal resonator or the like which is used in a watch, and more particularly relates to a method of manufacturing a hermetically sealed terminal in which the terminal plate and lead wires are fixed to a casing by an intervening insulated glass material held by a metallic outer frame.

A small quartz crystal resonator used in a quartz crystal electronic watch is shown in FIGS. 1A and 1B. A hermetically sealed terminal is composed of a pair of terminal plates 3a, 3b on which a quartz crystal resonator 2 is fixed electrically and mechanically. A set of lead wires 4a, 4b are brazed to terminal plates 3a, 3b respectively, an outer frame 5 brazed on the casing 1 in which the quartz crystal resonator 2 is 5 encased and a glass material 6 is held by the outer frame 5.

Conventional manufacturing methods of such hermetically sealed terminals are as follows. After lead wires 4a, 4b are fixed to the outer frame 5 by the glass material 6, the end portion of lead wires 4a, 4b is brazed to terminal 3a, 3b respectively by eutectic silver and copper. Since the lead wires 4a, 4b, the outer frame 5 and the glass material 6 are all heated again when lead wires 4a, 4b and terminal plates 3a, 3b are brazed, these component parts are apt to receive damage by heat shock. Since these component parts are extremely small, it is difficult to braze a pair of terminal plates 3a, 3b and lead wires 4a, 4b at the correct position keeping a precise distance between said terminal plates.

Another conventional manufacturing method of such hermetically sealed terminal is as follows. The terminal plate is made in one body shown by chained line 7 and hatching 3a, 3b in FIG. 1B. After lead wires 4a, 4b are brazed to the terminal plate and fixed to the outer frame 5 by glass material 6, the terminal plate is divided into two parts 3a, 3b taking off the part shown by chained line 7 by grinding or similar operation. After the brazing of the terminal plate and lead wires 4a, 4b, the parts are heated again when the glass material 6 is softened and therefore the terminal plates are apt to deviate from the correct position. This makes it difficult to divide the terminal plate while keeping predetermined accuracy.

As mentioned above, it is difficult to increase the yield rate of oscillator units and to introduce mass production by automatic assembling. For keeping the positional accuracy of the terminal plate, complicated moulds which are used at the heating process have to be prepared, and the working steps are increased.

As a result, it is difficult to increase productivity and to achieve low cost products.

SUMMARY OF THE INVENTION

The primary object of this invention is to provide a method of manufacturing hermetically sealed terminals by a simple assembling process elminating the above defects.

Another object of this invention is to provide low cost hermetically sealed terminals by mass production.

A further object of this invention is to provide a simple manufacturing method of hermetically sealed terminals suitable for mass production and for obtaining precise products.

According to the invention, the terminal plate element and the lead wires together with the outer frame and the lower casing are all brazed at the same time when the glass material is softened during one heating process so that the separate processes which were carried out separately in prior art techniques are eliminated.

Since all component parts are fixed by one heating process, no damage occurs owing to thermal shock. Since the terminal plate element is divided into a plurality of terminal plates by breaking off the unnecessary parts from half-etched grooves after the heating process is over, the distance between the two plates is kept accurately corresponding to the width of the slit.

The foregoing objects and other objects as well as the characteristic features of the invention will become more apparent and more readily understandable by the following description and the appended claims when read in conjunction with the accompanying drawings.

DETAILED DESCRIPTION OF THE INVENTION

Figure 2:
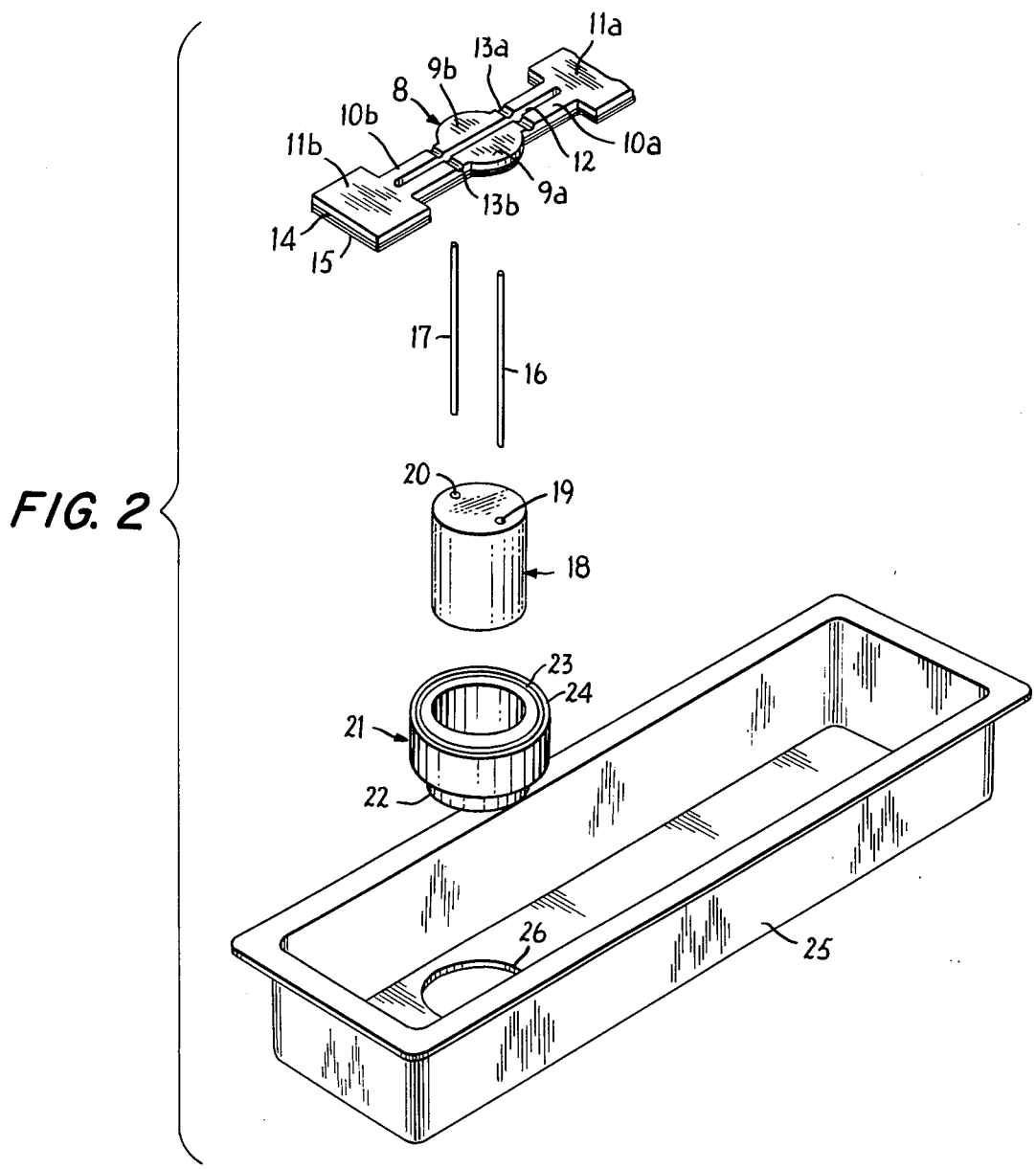
FIG. 2 shows a perspective exploded view of the disassembled component parts.

Now referring to drawings, this invention will be explained. FIG. 2 is a perspective exploded view showing the disassembled component parts according to this invention. The terminal plate element 8 is composed of terminal plates 9a, 9b with end portions having a pair of narrow parts 10a, 10b extending symmetrically from the terminal plates 9a, 9b and a pair of broad parts 11a, 11b connected to said narrow parts 10a, 10b, respectively. A longitudinal slit 12 passes through the center of said terminal plates 9a, 9b and the pair of narrow parts 10a, 10b, and half-etched grooves 13a, 13b are formed on each narrow part 10a, 10b and the grooves 13a, 13b extend crosswise to said slit 12.

On the reverse surface of the terminal plate element 8, there is provided double plated layer which consists of a silver plating layer 14 and a copper plating layer 15 acting as a brazing means. The material of the terminal plate element 8 consists of a sheet of conductive alloy including 50% iron and 50% nickel, and the element 8 is made by a chemical etching technique. The terminal plate elements 8 can be made individually, however, it is preferable to simultaneously make a plurality of terminal plate elements connecting them to each other at their broad parts 11a, 11b.

Lead wires 16, 17 are also made from metallic material including 50% iron and 50% nickel. A columnar glass material 18 having holes 19, 20 which pass through said lead wires 16, 17 is made from pre-sintered insulating glass. A cylindrical outer frame 21 having a part 22 of different diameter is made from iron or iron-nickel alloy and is provided with a double plated layer of a silver plating layer comprised 23 and a copper plating layer 24 acting as a brazing compound. Numeral 25 denotes the lower half of the casing which encloses a quartz crystal resonator and it is made from a ductile metal such as copper. A hole 26 which receives and fixes the part 22 of the outer frame 21 is provided at the bottom of the lower casing 25.

Component parts of the hermetically sealed terminal are such that the manufacturing method thereof will be explained next.

Figure 3A:
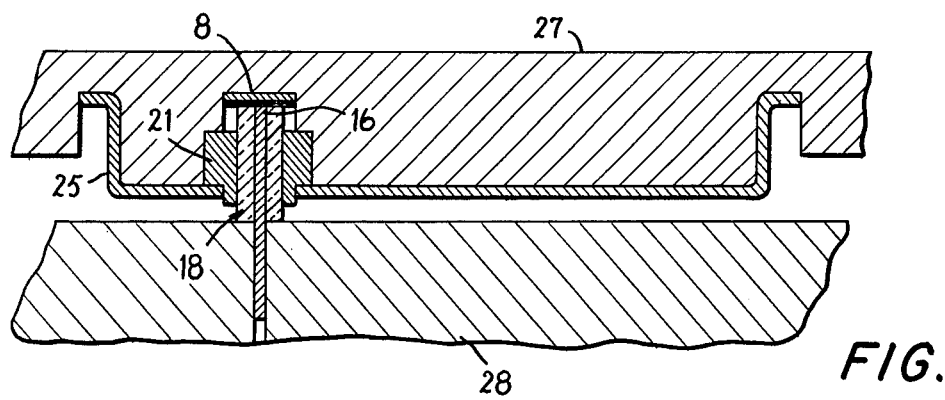
FIG. 3A shows a cross-sectional view of moulds in which component parts are assembled as viewed from the side.
Figure 3B:
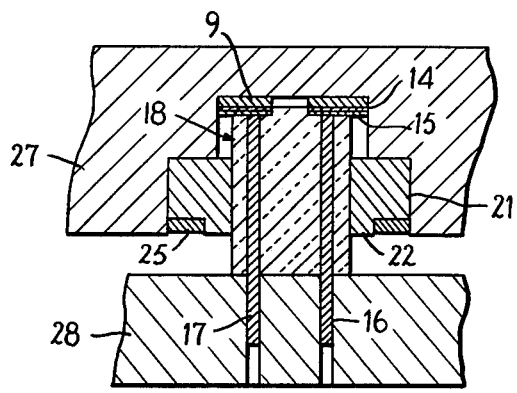
FIG. 3B shows a cross-sectional view of moulds in which component parts are assembled as viewed from the front.

First of all, lead wires 16, 17 are inserted into holes 19, 20 of the glass material 18 respectively, and the glass material 18 is inserted into the outer frame 21, and then the terminal plates 9a, 9b of the terminal plate element 8 is put on the top of lead wires 16, 17. This assembling process is carried out in moulds 27, 28 shown in FIGS. 3A and 3B, and by which the relative location of each component parts is positioned. Moulds 27, 28 are made from carbon are movable in the up and down direction along a guide member (not shown). The terminal plate elements are interconnected in succession at this stage, however, only one section is shown in FIG. 3A for ease of clarity.

Figure 4:
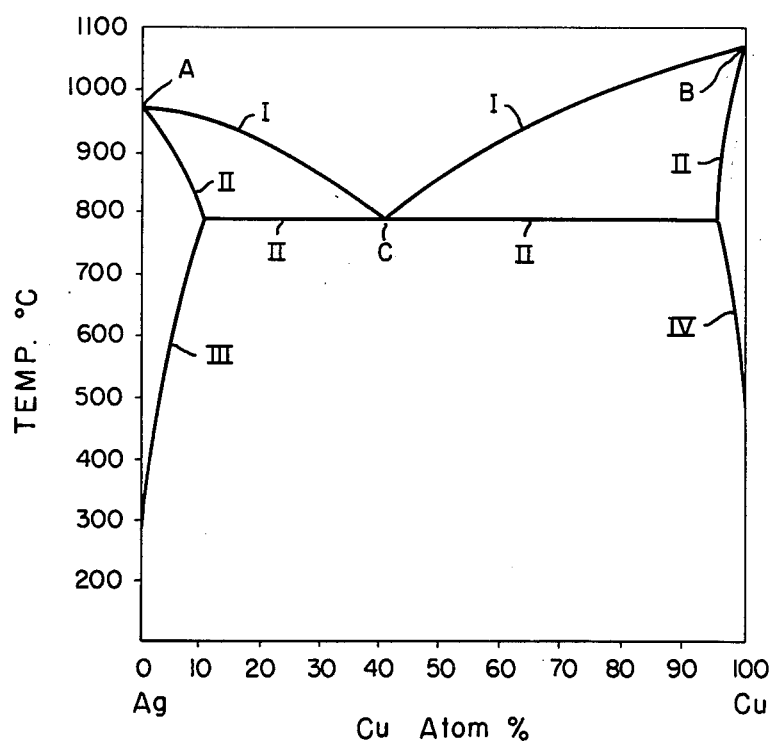
FIG. 4 shows phase diagram of the silver and copper alloy used as the brazing compound.

Component parts assembled in moulds 27, 28 are heated about 30 minutes at a temperature of 900° C in a furnace of neutral or weak reducing atmosphere. During this heating process, the silver plating layers 14, 23 and the copper plating layers 15, 24 provided on the terminal plate element 8 and the outer frame 21 fuse together as they melt at a temperature below 900° C. As a result, the terminal plate element 8 and lead wires 16, 17 are brazed together with the lower casing 25. As understood from the phase diagram of silver-copper alloy shown in FIG. 4, silver-copper alloy of which composition of silver and copper is within the specified weight ratio or atomic ratio is melted below the temperature of 900° C. This phenomenon may be understood from the liquidus I of Ag-Cu phase diagram. The line II is solidus, lines III and IV are solubility, A is the melting point of silver, B is the melting point of copper and C is the eutectic point. During the above heating process, since the glass material 18 made from barium-soda-lead compound is softened, the outer frame 21, lead wires 16, 17 and the terminal plate element 8 are hermetically sealed at the same time.

After the heating process is over, the component parts are taken out of moulds 27, 28. The terminal plate element 8 is broken at the half-etched grooves 13a, 13b, and narrow parts 10a, 10b and broad parts 11a, 11b are taken away from the terminal plate 9a, 9b. By such a technique, the terminal plates 9a, 9b are separated electrically keeping the distance corresponding to the width of the slit 12.

Figure 1A:
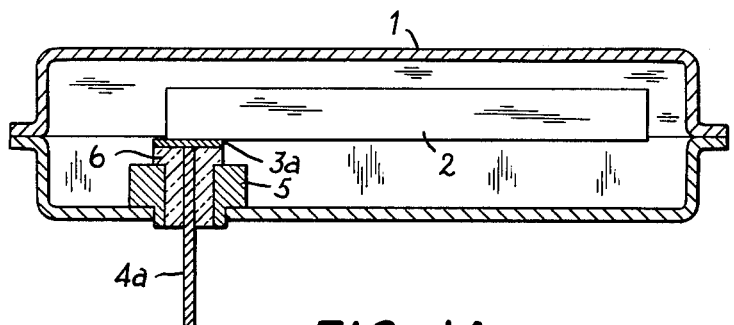
FIG. 1A shows a cross-sectional view of a quartz crystal resonator having a hermetically sealed terminal manufactured according to this invention.
Figure 1B:
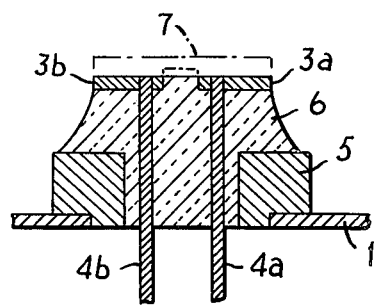
FIG. 1B shows a cross-sectional view of a hermetically sealed terminal as viewed from front.

After the separating or dividing process is over, a quartz crystal resonator is mounted on the terminal plates directly or via a mounting spring (not shown). Then an upper casing and a lower casing are sealed by cold welding in vacuum, and a quartz crystal resonator is completed such as shown in FIG. 1.

Many modifications may be made, for example, the half-etched grooves 13a, 13b made by chemical etching technique can be replaced by coarctate parts. At any rate, since the distance between two terminal plates are kept accurately by the existence of slit 12, it is easy to mechanize each manufacturing process for mass production.

According to the embodiment of this invention, the brazing compound is composed of silver plating layer and copper plating layer, however, it can be replaced by other brazing compounds which melt at the temperature when the glass material 18 is softened. It is not necessarily required to place the brazing compound over the whole area of the terminal plate element 8 and the outer frame 21, it is sufficient to place it at only the area where component parts are brazed.

Hence, it is desired that the foregoing shall be considered merely as illustrative and not in a limiting sense.

We claim:

1. A method of manufacturing a hermetically sealed terminal assembly comprising,
   a. providing a terminal assembly comprised of a terminal plate element composed of conductive material having predetermined weakened sections and having a brazing compound on at least a part thereof, a plurality of lead wires, a glass material having through holes through which said lead wires extend, a metallic outer frame having said glass material inserted therein and having a brazing compound on a part thereof, and a metallic casing having said outer frame disposed thereon with the brazing compound in contact therewith and which encloses a quartz crystal resonator or the like, said terminal plate element being disposed on said glass material such that the brazing compound contacts said lead wires,
   b. heating the terminal assembly one time to a temperature at which said glass material softens and said brazing compounds on said terminal plate element and said outer frame become fused to thereby integrally connect the component parts of the terminal assembly, and
   c. breaking off end portions of said terminal plate element at said weakened sections to thereby provide a hermetically sealed terminal assembly.

* * * * *